United States Patent

Farr

[15] 3,683,992

[45] Aug. 15, 1972

[54] SLOW MOTION CONVERTER FOR FIELD SEQUENTIAL COLOR TELEVISION SIGNALS

[72] Inventor: Kenneth E. Farr, Monroeville, Pa.

[73] Assignee: Westinghouse Electric Corporation, Pittsburgh, Pa.

[22] Filed: Sept. 10, 1970

[21] Appl. No.: 71,093

[52] U.S. Cl..........................178/5.4 CD, 178/6.6 FS

[51] Int. Cl.................................................H04n 5/78

[58] Field of Search.....................178/5.4 CD, 6.6 FS

[56] References Cited

UNITED STATES PATENTS

| | | | |
|---|---|---|---|
| 3,395,248 | 7/1968 | Suzuki et al. | ..........178/6.6 FS |
| 3,564,123 | 2/1971 | Pezirtzoglov | ..........178/6.6 FS |

*Primary Examiner*—Richard Murray

*Attorney*—F. H. Henson and E. P. Klipfel

[57] ABSTRACT

A slow motion converter for field sequential color television signals provides selection of an integer speed reduction factor and conversion of the field sequential signals to simultaneous color signals for processing to an NTSC color television signal. The converter includes helical tape playback apparatus for reading the field sequential signals from a magnetic recording tape and a magnetic drum including a plurality of recording heads corresponding to the color fields and write control means for selectively energizing the recording heads to record each color field, in sequence, on its corresponding recording band. A ratio selector, set to the desired speed reduction factor, effects repetitive reading from the tape of each recorded color field signal, and recording of each field sequential signal thus read on its corresponding reading band of the drum. Each previous recording on a given band of a given field signal is erased such that only the last of the repetitively read field signals from the tape remains recorded on its corresponding drum band. As the plurality of odd and even color field recordings on the drum are updated sequentially, the alternate odd or even set of previously recorded color field signals is simultaneously and repetitively read out from the drum a number of times corresponding to the speed reduction factor to provide the slow motion conversion, the simultaneous color field signals read in alternating sets thereof being processed for producing an NTSC color signal.

11 Claims, 3 Drawing Figures

PICTURE FRAME # 1 — PICTURE FRAME # 2

N x field rate f = field, N = 1
$t_{fn}$, n = N = 1

| FIELD | $t_{11}$ | $t_{21}$ | $t_{31}$ | $t_{41}$ | $t_{51}$ | $t_{61}$ | $t_{71}$ | $t_{81}$ | $t_{91}$ |
|---|---|---|---|---|---|---|---|---|---|
| $R_o$ | $W_{11}$ | $R_{21}$ | – | $R_{41}$ | – | $R_{61}$ | $W_{71}$ | $R_{81}$ | |
| $R_e$ | – | $W_{21}$ | $R_{31}$ | – | $R_{51}$ | – | $R_{71}$ | $W_{81}$ | $R_{91}$ |
| $B_o$ | – | – | $W_{31}$ | $R_{41}$ | – | $R_{61}$ | – | $R_{81}$ | $W_{91}$ |
| $B_e$ | – | – | – | $W_{41}$ | $R_{51}$ | – | $R_{71}$ | – | $R_{91}$ |
| $G_o$ | – | – | – | – | $W_{51}$ | $R_{61}$ | – | $R_{81}$ | – |
| $G_e$ | – | – | – | – | – | $W_{61}$ | $R_{71}$ | – | $R_{91}$ |

FIG. 2

PICTURE FRAME #1 — PICTURE FRAME #2

N x field rate f = field, N=2

$t_{fn}$, n=1,2

| FIELD | $t_{11}$ | $t_{12}$ | $t_{21}$ | $t_{22}$ | $t_{31}$ | $t_{32}$ | $t_{41}$ | $t_{42}$ | $t_{51}$ | $t_{52}$ | $t_{61}$ | $t_{62}$ | $t_{71}$ | $t_{72}$ | $t_{81}$ | $t_{82}$ | $t_{91}$ | $t_{92}$ |
|---|---|---|---|---|---|---|---|---|---|---|---|---|---|---|---|---|---|---|
| $R_o$ | $W_{11}$ | $W_{12}$ | $R_{21}$ | $R_{22}$ | – | – | $R_{41}$ | $R_{42}$ | – | – | $R_{61}$ | $R_{62}$ | $W_{71}$ | $W_{72}$ | $R_{81}$ | $R_{82}$ | – | – |
| $R_e$ | – | – | $W_{21}$ | $W_{22}$ | $R_{31}$ | $R_{32}$ | – | – | $R_{51}$ | $R_{52}$ | – | – | $R_{71}$ | $R_{72}$ | $W_{81}$ | $W_{82}$ | $R_{91}$ | $R_{92}$ |
| $B_o$ | – | – | – | – | $W_{31}$ | $W_{32}$ | $R_{41}$ | $R_{42}$ | – | – | $R_{61}$ | $R_{62}$ | – | – | $R_{81}$ | $R_{82}$ | $W_{91}$ | $W_{92}$ |
| $B_e$ | – | – | – | – | – | – | $W_{41}$ | $W_{42}$ | $R_{51}$ | $R_{52}$ | – | – | $R_{71}$ | $R_{72}$ | – | – | $R_{91}$ | $R_{92}$ |
| $G_o$ | – | – | – | – | – | – | – | – | $W_{51}$ | $W_{52}$ | $R_{61}$ | $R_{62}$ | – | – | $R_{81}$ | $R_{82}$ | – | – |
| $G_e$ | – | – | – | – | – | – | – | – | – | – | $W_{61}$ | $W_{62}$ | $R_{71}$ | $R_{72}$ | – | – | $R_{91}$ | $R_{92}$ |

FIG. 3

SLOW MOTION CONVERTER FOR FIELD SEQUENTIAL COLOR TELEVISION SIGNALS

BACKGROUND OF THE INVENTION

1. Field of the Invention

This invention relates to a slow motion converter for color television signals and, more particularly, for color television signals of the field sequential type.

2. Description of the Prior Art

As is well known, in a field sequential system for color television, the camera scans the image to be transmitted in accordance with a repeating sequence of three different, uniform color frames. Typically, an optical filter defining the three primary colors is interposed between the camera and the scene to be scanned, with the filter being rotated to sequentially interpose the three color filters in synchronism with the frame rate of scan of the camera.

In accordance with NTSC standards, each frame comprises 525 horizontal scan lines in an interlaced raster of two successively scanned fields. Each field is scanned in one-sixtieth of a second and thus each frame in one-thirtieth of a second, the two fields of each frame being referred to as odd and even fields.

In a field sequential system, therefore, each primary color is scanned in a primary color frame including an odd and an even field each of one-sixtieth of a second duration. The scanning of three primary color frames thus occupies three frame times, or one-tenth of a second. By contrast, NTSC color television standards for network broadcasting require a color television signal in which the information of the three primary colors is provided substantially simultaneously throughout each frame of scan; thus, each color frame is of one-thirtieth of a second duration.

Field sequential cameras are more desirable for use than simultaneous color cameras in applications where size and weight restrictions are imposed, and afford greater reliability since the exacting registration requirements of the simultaneous three color system are not imposed. Thus, there are various applications where a field sequential system is employed, rather than a simultaneous system such as the NTSC system. Where subsequent network broadcast is desired, therefore, conversion of the field sequential signals to simultaneous NTSC signals is necessary.

Color television camera chains or signal processing systems have been proposed for producing a simultaneous color signal in accordance with NTSC standards from a field sequential signal through the use of a magnetic recording drum or disk. The field sequential signal is recorded onto a magnetic recording drum or disk and subsequently replayed as a field simultaneous signal which is further processed to conform with NTSC standards.

Slow motion conversion of either monochrome or NTSC color television signals is relatively easily accomplished through the use of a helical tape recording machine. In effecting the slow motion conversion, the speed of the tape transport is reduced by a desired speed reduction factor such that the simultaneous color information for each field recorded on the tape is read repetitively in accordance with the selected speed reduction factor.

This and other techniques employed in monochrome and simultaneous color television systems are inapplicable to field sequential systems since repetitive reading of a single field provides only the color information of a single color field, and destroys the necessary order and sequence of the successive fields required for color reproduction. More specifically, motion conversion of a field sequential signal requires the ability to select and operate on the individual color frames while maintaining them individually and in the proper sequence, and also to permit of their subsequent simultaneous and repetitive reading for conversion to an NTSC color television signal. The system of the invention provides for accomplishing these required functions in a relatively simplified manner and in a system which directly provides for conversion of the field sequential signal to a simultaneous signal while affording a slow motion conversion, selected in accordance with any desired speed reduction factor comprising an integer.

These and other features and advantages of the system of the invention will readily be apparent from the following detailed description of the invention.

SUMMARY OF THE INVENTION

The slow motion converter of the invention may incorporate, or be used with, a helical video tape recorder employed for reading a field sequential color television signal recorded on the tape. A ratio selector for selecting the speed reduction factor, comprising any integer, adjusts the tape drive for supplying the tape to the helical reading apparatus at a rate reduced in accordance with the slow motion conversion ratio. The rotating read head of the tape playback mechanism is driven at a normal rate to traverse the tape and thus read each field recorded on the tape at the normal field rate. By controlling the rate of tape drive, as described, the helical read head will read the same field information a number of times corresponding to the speed reduction factor.

Recording means such as a magnetic drum or disk is provided and has a plurality of recording heads for communicating with recording bands of the drum, each band being respectively associated with one of the odd and even, three color fields. The signal read from the helical tape is supplied to the respective corresponding head and recorded on the corresponding band of the drum, the drum completing one full revolution for each field and thus in one-sixtieth of a second. Each recording head erases any information previously recorded in its band simultaneously with recording new information therein and, in the case of the slow motion converter of the invention, erases each prior recording resultant from the repetitive reading of a single field from the tape such that only the last reading of that field remains recorded on the drum. Thus, the odd and even fields of each color frame are read, in their normal sequence, and each is read repetitively, a number of times corresponding to the slow motion conversion factor, and is recorded on the corresponding band of the magnetic drum by the write control means that same number of times. The information recorded on the drum thus comprises a set of three odd primary color fields, and a set of three even primary color fields, all of which recorded fields are sequentially updated.

Read control means include switch means for simultaneously receiving the read outputs of the drum recording heads corresponding to the set of odd color fields, and alternatively, the read outputs of the drum recording heads corresponding to the set of even color fields in a continuous alternating sequence. Switching between the odd and even sets of simultaneously read, primary color field signals occurs at a rate equal to the field switching rate times the speed conversion factor. The primary color field signals, first of the odd set, and then of the even set, thus are read simultaneously at the normal field rate, and repetitively in accordance with the speed conversion factor; further, the fields are continuously and individually updated at the field sequential rate, as likewise modified by the speed conversion factor.

BRIEF DESCRIPTION OF THE DRAWINGS

FIGS. 2 and 3 comprise timing charts serving to illustrate the operation of the system of the invention as shown in FIG. 1.

DETAILED DESCRIPTION OF THE INVENTION

Figure 1:
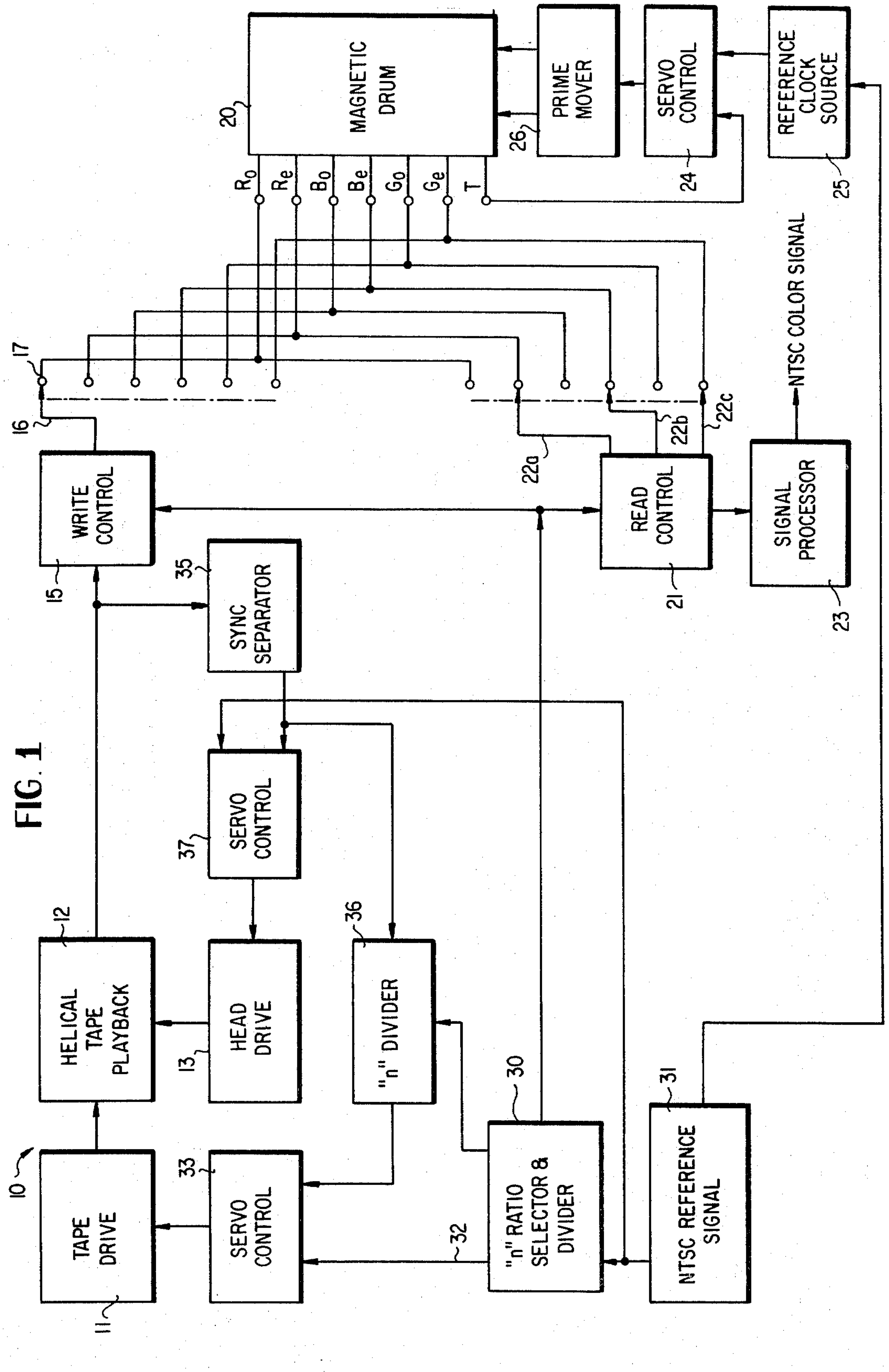
FIG. 1 comprises a block diagram of the slow motion converter of the invention.

In FIG. 1, the slow motion converter of the invention includes a helical video tape system 10 including a tape drive 11 and a helical tape playback unit 12 for reading recorded information from the tape. The tape playback unit 12 includes a rotatable recording head (not shown) driven in rotation by head drive mechanism 13. Details of control systems for synchronizing the drives of the tape and the recording head are not shown herein since they are well known in the art.

The field sequential color television signal read from the tape by playback unit 12 is supplied to a write control system 15 which includes switching means 16, diagrammatically indicated, for selectively communicating with a plurality of switch connections 17, as indicated by the dotted line. Each of the terminals 17 is connected to a corresponding magnetic reading head of a magnetic drum 20. As will hereinafter be apparent, any magnetic recording mechanism having repetitive recording and reading capabilities satisfying the characteristics of the drum 20 as employed in the system of the invention herein disclosed may be employed as an alternative. For example, a magnetic recording disk could also be employed.

The recording heads of the drum 20 are represented by the group of output terminals labelled $R_0$, $R_e$, . . . $G_e$, respectively corresponding to the primary color, i.e., red, blue, and green, odd and even fields of a field sequential color television signal. Each recording head is operable to record the associated, primary color television field signal received at its input terminal and to read the signal thus recorded from its corresponding band of the drum 20. Further, the write control 15 operates each recording head to erase information recorded by it in a previous field time interval, and thus in a previous revolution of the drum 20, and to simultaneously record on the thus erased band the field information signal then currently received from the tape playback system 12.

Associated with the drum 20 is a read control system 21 having a set of selectively movable switching contacts 22*a*, 22 *b*, and 22*c*. As more fully explained hereafter, the set of contacts 22*a* through 22*c* is selectively movable for connection to the recording head terminals of drum 20 corresponding to the set of odd, or to the set of even primary color fields recorded thereon. Thus, the primary color field signals simultaneously read from the bands of the drum are selected in accordance with the odd or even sets thereof by the contacts 22*a* through 22*c*, in response to the read control system 21 for supply to signal processor 23. Processor 23 then operates to produce an NTSC color signal at its output, as indicated. Conversion of the three, simultaneous primary color field signals to the NTSC color signal format is well known and thus is shown only diagrammatically by the signal processor 23.

Since extreme accuracy is required in the conversion from field sequential to simultaneous signals, the magnetic drum 20 must be driven in rotation at a uniform, precise rate. For this purpose, conveniently, a prerecorded band of clock signals may be provided on drum 20 to be read by a further head associated with the output terminal T, the clock signals thus read being supplied to a servo control system 24. Reference clock signals from reference clock source 25 are also supplied to servo control 24 which then effects a control of the prime mover 26 for the drum 20 to rotate it at a precise rotational velocity conforming to the required standards. For the disclosed system, rotation at the field rate is required, and thus at 60 revolutions per second.

Selection of the desired speed reduction factor for the slow motion conversion is effected by the "*N*" ratio selector and divider 30, where "N" represents the desired speed reduction factor, and must be an integer. In effect, the slow motion conversion is in accordance with a speed reduction factor of $1/N$ where, if $N=1$, normal speed reproduction is obtained, and if $N=2, 3, . . .$, the motion is made progressively slower.

Although other suitable portions of a television signal may be employed to effect the timing control of the system, it will be assumed hereinafter that the vertical sync, or vertical drive pulse of the television signal as recorded, and thus the field rate of the recorded signal, will be employed as the base time period. As noted previously, the field rate is one-sixtieth of a second.

The selector and divider 30 receives a reference frequency signal at the vertical field rate from the unit 31, which may comprise an NTSC reference signal source. The selector portion of the system 30 provides for selecting the desired integer, or factor "*N*," to establish the desired speed conversion. The divider function performed by the unit 30 conveniently is performed by a counter which is set to count to the value of "*N*" and produce an overflow on the next count pulse received in response to the reference frequency pulses from the reference source unit 31. Thus, the selector and divider 30 provides on the output 32 a control pulse train at a rate defined by the ratio of $1/N$-times the field rate. This control pulse train is applied to a servo control system 33 for driving the tape drive 11 at a corresponding rate to effect the desired slow motion conversion. Again, if $N=1$ for normal motion, the control pulse rate conforms to that required for driving tape drive 11 to produce normal motion, or normal speed reproduction. Conversely, where $N=2$, the control pulse rate is one-half that of the rate for normal speed reproduction and the tape drive 11 drives the tape at one-half the normal speed.

The output signal produced by the helical tape playback unit 12 is supplied to a sync separator 35 which separates the vertical sync pulses from the signal and supplies them to an "*N*" divider circuit 36. The "*N*" divider circuit 36 is controlled by the ratio selector and divider 30 in accordance with the value of "*N*" set therein, to produce at its output a pulse train of $1/N$ times the field frequency rate actually being reproduced by the system. The servo control 33 responds to the control pulse train from divider 32, as derived from the reference signal, and to the pulse train from divider 36, as derived from the signal read by the helical tape playback unit 12, to maintain accurate control of the tape drive 11. The output of the sync separator 35 also is supplied to servo control 37 which additionally receives a reference field rate signal from reference source 31 to accurately control the rotational velocity produced by head drive circuit 13.

Although not shown, the system of FIG. 1 typically includes means for providing additional fine speed adjustments and synchronization controls, such as locking of the horizontal and vertical rates of the television signals reproduced by the tape playback unit 12 to the NTSC color subcarrier.

The pulse train output of the selector and divider 30 is also supplied to the write control system 15 and the read control system 21. Where $N$=1 and thus for normal motion reproduction, the write control system 15 causes the switch 16 to step along contacts 17 at the field frequency rate and thus to remain engaged with each contact, in succession, for a period of one-sixtieth of a second. Where speed conversion is to be effected, in accordance with a given integer "*N*," the write control system 15 controls contact 16 to remain at each position 17 for a time equal to $N/60$. Similarly, read control system 21 operates its set of contacts 22*a* through 22*c* to switch alternately between the odd and even sets of contacts, as indicated, at the field rate and thus to remain engaged with each set for a period of one-sixtieth of a second where $N \leq 1$ during normal speed reproduction and for $N$/sixtieth of a second when speed conversion is being effected in accordance with the reduction factor "*N*."

To facilitate an explanation of the system of the invention, reference may be had to FIGS. 2 and 3 which comprise timing charts corresponding to the read and write functions for the conditions of $N$=1 or normal time reproduction in FIG. 2 and $N$=2 or ½ speed reduction in the chart of FIG. 3. In each of FIGS. 2 and 3, a complete picture frame includes six primary color fields and thus three primary color frames.

The letters $W_{fn}$ and $R_{fn}$ represent, as to W and R, the read and write functions. The subscript $f$ represents a number from one to six corresponding to the six, odd and even three primary color fields. The subscript $n$=1, 2, . . . $N$ where $N$ is the desired speed reduction factor. Particularly, where $n=N=1$, normal speed reproduction is performed, whereas for $N$=2, i.e., ½ speed reduction, $n$=1, 2; thus, $W_{fn} = W_{f1}$ and $W_{f2}$ and similarly $R_{fn} = R_{f1}$, $R_{f2}$, where in each instance $f$=1, 2, . . . 6, signifying the repetitive write and read functions, respectively, for the six primary color fields. As previously noted, in each full picture frame there are three primary color frames and six primary color fields. For convenience, in picture frame No. 1 the fields are numbered $f$=1, 2, . . . 6 and in the portion of picture frame No. 2 illustrated, the field number continues consecutively and thus $f$=7, 8, . . . In fact, field 6 completes picture frame No. 1 and thus field 7 begins the successive picture frame No. 2. The information of the color field signal during field 7 replaces that previously provided during field 1 and similarly as to fields 8 and 2, thus effecting the sequential updating operation.

Referring more specifically to FIG. 2, it is apparent that each of the fields $R_0$ through $G_e$ is recorded in the drum sequentially in the corresponding recording bands in the time intervals $t_{11}$ through $t_{61}$ as represented by the functions $W_{11}$ through $W_{61}$. Assuming the drum not to previously have been loaded, i.e., no prior information recorded thereon, the read function is shown only for those bands in which the write function has been performed to record information. The sequential loading of the drum is thus more clearly illustrated and the continuous, sequential updating of the fully loaded drum is thereby more fully appreciated, for example with reference to picture frame No. 2. Thus, during read function $R_{71}$, the band for the odd color field $R_0$ is updated by the write function $W_{71}$. The read function $R_{71}$ simultaneously occurring during $t_{71}$ includes reading of the primary color field information of the alternate set of color fields recorded at various earlier times. More specifically, since the write function $W_{71}$ updates the recording of the odd color field $R_e$, the read function $R_{71}$ operates on the previously recorded, alternate set of even color fields $R_e$, $B_e$, $G_e$.

As previously noted, the invention provides for maintaining the proper reference of the color fields during the slow motion conversion, in accordance with the field sequential presentation of the information which is ultimately read in the noted simultaneous sets. Thus, for example, the read function $R_{71}$ during time $t_{71}$ as to field $R_e$ corresponds to information recorded by write function $W_{21}$ during $t_{21}$, for field $B_e$ corresponds to write function $W_{41}$, and for field $G_e$ corresponds to the write function $W_{61}$.

The motion conversion function is represented in FIG. 3 for the time reduction factor of $N$=2. Each field of primary color information is read from the magnetic tape two times, recorded on the drum so as to retain the last recording thereof exclusively, and each recorded band of field information is read twice. Each of the repetitive write and read functions occurs in a normal frame time and thus, as is apparent from the read out function, ½ speed reduction of the video information is achieved. Again, the drum is sequentially loaded in the initial loading and sequentially updated while simultaneous and repetitive read out of the recorded information is performed. More specifically, in FIG. 3, whereas a repetitive write function is indicated in two successive field time periods for each primary color, e.g., $W_{11}$ and $W_{12}$ for field No. 2, only the last recorded field corresponding to function $W_{12}$ is retained on the drum, the field information recorded in field time $W_{11}$ being simultaneously erased as the write function $W_{12}$ is performed. The repetitive read function is readily apparent as to each band of recorded field information. For example, since $N$=2, in the repetitive time period $t_{61}$, $t_{62}$, the read functions $R_{61}$ and $R_{62}$ are performed in a repeating sequence, simultaneously for the odd set of primary color fields $R_0$, $B_0$, and $G_0$. During the next field period $t_{71}$, $t_{72}$, the $R_0$ field information is updated by the write function $W_{71}$, $W_{72}$ and the read function $R_{71}$, $R_{72}$ is performed for the set of even color fields $R_e$, $B_e$, and $G_e$.

Thus, the slow motion conversion effected by the system of the invention maintains the fields separated and in their proper sequence for simultaneous reading in alternating sets of odd and even fields, in accordance with the speed reduction factor "*N*," updating of the recorded information being effected sequentially in accordance with the field sequential signals as also provided at a rate controlled by the factor "*N*." The simultaneous primary color fields, alternating between odd and even sets thereof, are therefore readily adapted for processing to an NTSC color signal.

It will be evident that modifications may be made in the system described herein without departure from the scope of the invention. For example, separate write and read heads may be provided for the drum 20, and for the write function a single write head may be advanced to the successive recording bands at the required sequential rate as an alternative to the disclosed switching operation. Further, a full primary color frame comprising two fields may be recorded around the circumference of the drum 20, with appropriate change of the head positions and switching operations for the write and read functions. Numerous other modifications will also be apparent to those skilled in the art. Accordingly, the invention is not to be considered limited by the description, but only by the scope of the appended claims.

I claim as my invention:

1. A slow motion converter for field sequential color television signals supplied from a video helical tape recording thereof, the field sequential signals comprising an odd field signal and an even field signal for each primary color, related as odd and even sets, respectively, of primary color field signals, said converter comprising:

a ratio selector for selecting a motion conversion factor, means for controlling the tape drive of helical video tape playback apparatus to effect reading of field sequential signals from the video tape recording thereof individually and in sequence at the field rate, said drive control means being responsive to the ratio selector to effect repetitive reading from the tape of each field signal in accordance with the selected motion conversion factor;

recording means for selectively recording the field sequential signals of each successive sequence thereof read from the tape in respectively corresponding recording bands, said recording means being responsive to said ratio selected to provide a recording of only one of the repetitive readings at each field signal in the corresponding band, means for selectively and simultaneously reading in an alternating sequence the odd and even sets of the recorded field signals from the corresponding recording bands, said reading means being responsive to said ratio selector for reading said preselected recorded field signals of each set repetitively in accordance with the motion conversion factor.

2. A slow motion converter as recited in claim 1 wherein there is further provided signal processing means responsive to said reading means for processing the alternating sets of simultaneously read color field signals to a color signal format for network broadcasting.

3. A slow motion converter as recited in claim 1 wherein said ratio selector comprises a counter responsive to a reference frequency signal at the vertical field rate and set to overflow and reset at a count of the motion conversion factor to provide a control output having a frequency corresponding to the reference frequency times the ratio defined by the conversion factor.

4. A slow motion converter as recited in claim 3 wherein said tape drive control means includes:

a sync separator for separating vertical sync pulses at the vertical field rate from the television signal derived from reading the video tape recording, a further counter set by said ratio selector to overflow at a count of the motion conversion factor and responsive to the pulse train output of said sync separator for producing a further control output having a frequency corresponding to the frequency of the separated sync pulses times the ratio defined by the motion conversion factor, and servo control means responsive to the control output of said ratio selector and the further control output of said counter of said tape drive control means to synchronize the tape drive for reading of the field sequential signals at the field rate and repetitively in accordance with the selected motion conversion factor.

5. A slow motion converter as recited in claim 1 wherein said recording means comprises:

a magnetic drum having a plurality of recording bands respectively corresponding to the sequence of odd and even primary color fields of the color television signal and magnetic recording means for selectively recording the field sequential signals in the corresponding recording bands, and said selective reading means of said magnetic drum includes magnetic recording heads communicating with said recording bands and means for simultaneously receiving the outputs of the reading heads for the alternately selected odd and even sets of primary color field recording bands.

6. A slow motion converter for field sequential color television signals supplied from a video helical tape recording thereof and including odd and even sets of odd primary color fields and even primary color fields, respectively, comprising:

a ratio selector for selecting a motion conversion factor, helical video tape playback apparatus including a tape drive for the video tape and a head drive for a rotating read head, said head drive being driven in rotation at the field rate and said tape drive driving the video tape past said read head in synchronized relationship to the rotation of the read head to effect synchronized reading of the field sequential signals individually and at the field rate from the tape, recording means including a magnetic recording drum, a plurality of recording heads for recording field sequential signals read from the tape in respectively corresponding recording bands of said drum and for reading the recorded field signals from the corresponding recording bands, and a plurality of terminals connected to the recording heads, first switching means for selectively engaging said terminals in succession and controlled by said ratio selector for engaging each of said terminals for a period defined by the field rate times the conversion factor, said first switching means being connected to said read head of said tape playback apparatus and supplying the field sequential read from said tape through said successively engaged terminals to said recording heads of said drum to effect recording of each field signal in its corresponding recording band repetitively in accordance with the motion conversion factor, and second switching means for selectively and alternately engaging said terminals in first and second sets thereof in accordance with the corresponding odd and even color field signal recording bands, for simultaneously receiving the primary color field signals read from the corresponding bands in an alternating succession of the odd and even sets thereof, said second switching means being controlled by said ratio selector to engage each of said first and second sets of terminals for a period defined by the field rate times the conversion factor to simultaneously read out the color field signals alternately for said odd and even sets thereof and repetitively in accordance with the conversion factor.

7. A slow motion converter as recited in claim 6 wherein said ratio selector controls said first and second switching means to effect simultaneous reading of the color field signals of one of said odd and even sets during the recording of a color field signal of the other of said sets.

8. A slow motion converter as recited in claim 6 wherein:

said ratio selector is responsive to a reference frequency source to provide a tape drive control signal to said tape drive at the reference frequency times the ratio defined by the frequency conversion factor, said head drive responds to the reference frequency source to drive the head in rotation at the field rate, and said magnetic recording drum includes drum drive means responsive to the reference frequency source for driving said drum in rotation at the field rate and in synchronism with the reading of the field sequential signals by the rotating read head of said video tape playback apparatus.

9. Apparatus for processing field sequential signals to provide slow motion images thereof, said apparatus comprising:

first storage means for storing and upon actuation for reading-out in sequence first and second field sequential signals, indicative respectively of first and second primary colors;

control means for actuating said storage means in accordance with a selected reduction factor to read the first and second field sequential signals from said first storage means in sequence at the field rate and to effect the repetitive readout of each of the field sequential signals in accordance with the selected reduction factor;

second storage means for recording thereon the first and second field sequential signals of each sequence thereof derived from said first storage means onto recording bands corresponding to the first and second primary colors; and means for selectively and simultaneously reading out a set of recorded field signals corresponding to each of the first and second primary colors, said reading means being responsive to said control means to read the recorded field signals of the set repetitively in accordance with the selected reduction factor.

10. Apparatus as claimed in claim 9, wherein said second storage means includes means for erasing any signal previously recorded in one of said recording bands simultaneously with the recording of a new field sequential signal thereon.

11. Apparatus as claimed in claim 9, wherein the first and second field sequential signals comprise an odd field signal and an even field signal, and wherein said second storage means includes first, second, third and fourth recording bands for storing thereon the odd and even field signals of the first and second field sequential signals and said reading means for reading simultaneously from the first and third recording band odd field signals of the first and second field sequential signals and alternatingly in sequence, for reading simultaneously from said second and fourth recording bands the even field signals of the first and second field sequential signals.

* * * * *